(12) United States Patent
Spangler et al.

(10) Patent No.: US 10,458,252 B2
(45) Date of Patent: Oct. 29, 2019

(54) COOLING PASSAGES FOR A GAS PATH COMPONENT OF A GAS TURBINE ENGINE

(71) Applicant: United Technologies Corporation, Farmington, CT (US)

(72) Inventors: Brandon W. Spangler, Vernon, CT (US); Atul Kohli, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 725 days.

(21) Appl. No.: 14/955,167

(22) Filed: Dec. 1, 2015

(65) Prior Publication Data

US 2017/0152751 A1 Jun. 1, 2017

(51) Int. Cl.
| | | |
|---|---|---|
| *F01D 5/18* | (2006.01) | |
| *F01D 5/14* | (2006.01) | |
| *F01D 9/02* | (2006.01) | |
| *F01D 11/08* | (2006.01) | |
| *F01D 25/12* | (2006.01) | |
| *F02C 3/04* | (2006.01) | |
| *F01D 5/28* | (2006.01) | |

(52) U.S. Cl.
CPC ............. *F01D 5/187* (2013.01); *F01D 5/147* (2013.01); *F01D 5/284* (2013.01); *F01D 9/02* (2013.01); *F01D 11/08* (2013.01); *F01D 25/12* (2013.01); *F02C 3/04* (2013.01); *F05D 2220/32* (2013.01); *F05D 2240/35* (2013.01); *F05D 2250/14* (2013.01); *F05D 2250/185* (2013.01); *F05D 2250/71* (2013.01); *F05D 2260/22141* (2013.01); *F05D 2300/131* (2013.01); *F05D 2300/6033* (2013.01)

(58) Field of Classification Search
CPC ...... F02K 1/04; F02K 3/06; F02C 7/24; F02C 9/18; F04D 27/0215
See application file for complete search history.

(56) References Cited

U.S. PATENT DOCUMENTS

| | | |
|---|---|---|
| 3,156,808 A | 11/1964 | Davies et al. |
| 4,344,738 A | 8/1982 | Kelly et al. |
| 4,923,371 A | 5/1990 | Ben-Amoz |
| 5,340,278 A | 8/1994 | Magowan |
| 6,079,946 A | 6/2000 | Suenaga et al. |
| 6,190,128 B1 | 2/2001 | Fukuno et al. |
| 7,220,103 B2 | 5/2007 | Cunha et al. |
| 7,686,581 B2 | 3/2010 | Brittingham et al. |
| 8,047,787 B1 | 11/2011 | Liang |

(Continued)

FOREIGN PATENT DOCUMENTS

| | | |
|---|---|---|
| EP | 0501813 | 9/1992 |
| EP | 2713010 | 4/2014 |

(Continued)

OTHER PUBLICATIONS

European Search Report for Application No. 16201463.3 dated Apr. 13, 2017.

*Primary Examiner* — Craig Kim
(74) *Attorney, Agent, or Firm* — Carlson, Gaskey & Olds, P.C.

(57) ABSTRACT

A gas path component for a gas turbine engine includes an element configured to be exposed to a gas path. The element includes a plurality of internal cooling passages. At least one of the internal cooling passages includes a cross section having a plurality of asymmetrical filleted corners.

19 Claims, 4 Drawing Sheets

(56) References Cited

U.S. PATENT DOCUMENTS

2003/0002979 A1 1/2003 Koschier
2013/0259704 A1* 10/2013 Zhang .................... F01D 5/081
                                              416/97 R
2015/0198049 A1* 7/2015 Jung ...................... F01D 5/187
                                              416/1

FOREIGN PATENT DOCUMENTS

| JP | 2011214555 | 10/2011 |
| WO | 2014116475 | 7/2014 |
| WO | 2015031106 | 3/2015 |
| WO | 20150094531 | 6/2015 |

* cited by examiner

COOLING PASSAGES FOR A GAS PATH COMPONENT OF A GAS TURBINE ENGINE

TECHNICAL FIELD

The present disclosure relates generally to cooling passages for a gas path component, and more specifically to a cross sectional geometry of cooling passages for a gas path component.

BACKGROUND

Gas turbine engines, such as those used in commercial and military aircraft, operate at extreme temperatures in order to ensure peak efficiency of the turbine operation. As a result of the extreme temperatures, the components of the gas turbine engine that are exposed to the gas path (referred to as gas path components) are subjected to temperatures beyond the point at which their constituent material could begin to break down.

In order to prevent the gas path components from being damaged, the gas path components are actively cooled. In one example, the active cooling takes the form of cooling passages disposed within the gas path component. The cooling passages allow a cooling fluid, such as air, to pass through the internal portions of the gas path component. As the fluid passes through the internal portions of the component, the cooling fluid absorbs heat from the gas path component, thereby maintaining a cooler temperature of the gas path component. The cooler temperature prevents damage to the gas path component and expands the life cycle of the gas path component.

SUMMARY OF THE INVENTION

In one exemplary embodiment a gas path component for a gas turbine engine includes an element configured to be exposed to a gas path, the element including a plurality of internal cooling passages, and at least one of the internal cooling passages includes a cross section having a plurality of asymmetrical filleted corners.

In another exemplary embodiment of the above described gas path component for a gas turbine engine each of the asymmetrical filleted corners is paired with at least one adjacent asymmetrical filleted corner and each pairing of asymmetrical filleted corners forms a semi-ellipse.

In another exemplary embodiment of any of the above described gas path components for a gas turbine engine each of the semi-ellipses is separated from the other semi-ellipse via a flat.

In another exemplary embodiment of any of the above described gas path components for a gas turbine engine each semi-ellipsis is paired with an adjacent semi-ellipsis, thereby forming a complete ellipse.

In another exemplary embodiment of any of the above described gas path components for a gas turbine engine each of the asymmetrical filleted corners is an elliptical arc.

In another exemplary embodiment of any of the above described gas path components for a gas turbine engine the elliptical arc is an arc of an ellipse having a ratio of a first axis to a second axis in the range of 1/5 to 5/1.

In another exemplary embodiment of any of the above described gas path components for a gas turbine engine the ratio of the first axis to the second axis is in the range of 1/3 to 3/1.

In another exemplary embodiment of any of the above described gas path components for a gas turbine engine the elliptical arc of each of the asymmetrical filleted corners is an arc of a single ellipse.

In another exemplary embodiment of any of the above described gas path components for a gas turbine engine the cross section is approximately normal to an expected fluid flow through the cooling passage.

In another exemplary embodiment of any of the above described gas path components for a gas turbine engine the element is at least partially constructed of one of molybdenum and a ceramic matrix composite.

In another exemplary embodiment of any of the above described gas path components for a gas turbine engine the element is one of a blade, a vane, and a blade outer air seal.

In another exemplary embodiment of any of the above described gas path components for a gas turbine engine wherein the element is a radially spanning element configured to at least partially span a gas path of a turbine engine.

An exemplary method for reducing thermal stress in a gas path component of a gas turbine engine includes disposing at least one cooling passage internal to a gas path component. The cooling passage includes a cross section normal to an expected flow of coolant through the cooling passage, the cross section including a plurality of asymmetrical filleted corners.

Another example of the above described exemplary method for reducing thermal stress in a gas path component of a gas turbine engine includes disposing at least one cooling passage internal to the gas path component comprising separating two internal cooling passages via a rib. The rib includes a smallest cross section normal to an expected flow of coolant through the internal cooling passages at a center point in the cross section normal to the expected flow of coolant.

Another example of any of the above described exemplary methods for reducing thermal stress in a gas path component of a gas turbine engine includes disposing at least one cooling passage internal to the gas path component further includes provide asymmetrical filleted corners for each corner of the at least one passage.

Another example of any of the above described exemplary methods for reducing thermal stress in a gas path component of a gas turbine engine includes providing asymmetrical filleted corners for each corner of the at least one passage further comprises providing an ellipse shaped cross section of the cooling passage normal to an expected direction of fluid flow through the cooling passage.

In one exemplary embodiment a gas turbine engine includes a compressor section, a combustor section fluidly connected to the compressor section, a turbine section fluidly connected to the combustor section, and at least one gas path component including internal cooling passages. Each of the internal cooling passages includes a cross section approximately normal to an expected direction of fluid flow, the cross section including a plurality of asymmetrical filleted corners.

In another exemplary embodiment of the above described gas turbine engine at least one of the asymmetrical filleted corners is an elliptical arc of a single ellipse.

In another exemplary embodiment of any of the above described gas turbine engines each of the elliptical arcs is directly connected to at least one adjacent elliptical arc, thereby forming a semi-ellipse.

In another exemplary embodiment of any of the above described gas turbine engines each of the elliptical arcs is directly connected to two adjacent elliptical arcs, thereby forming a full ellipse.

These and other features of the present invention can be best understood from the following specification and drawings, the following of which is a brief description.

DETAILED DESCRIPTION OF AN EMBODIMENT

Figure 1:
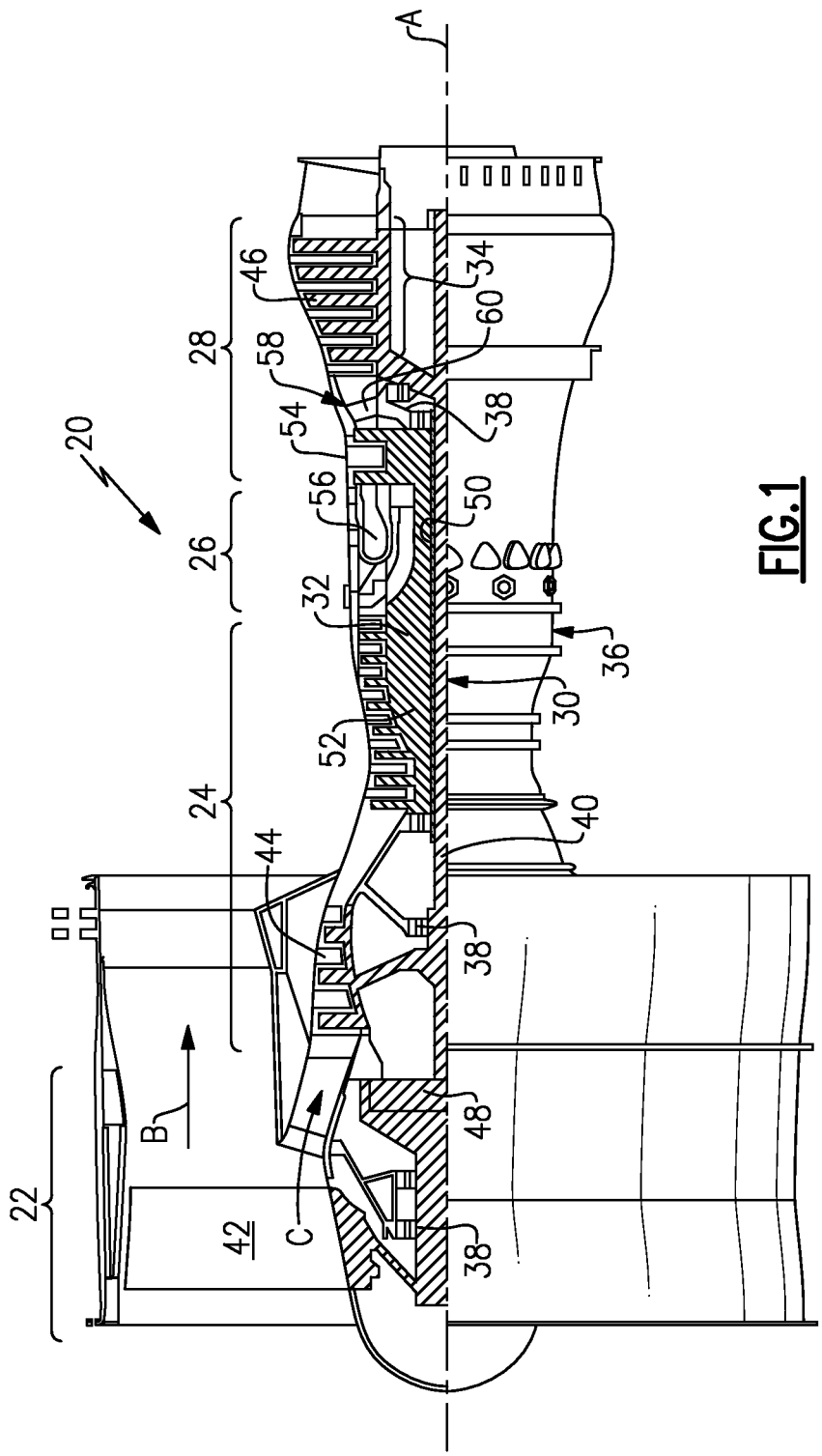
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (1066.8 meters). The flight condition of 0.8 Mach and 35,000 ft (1066.8 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/s).

In order to improve operating efficiencies of the turbine engine 20, the engine 20 is operated at extreme temperatures. The temperatures are at their highest at a turbine section inlet, where combustion products from the combustor section are expelled into the turbine section along the primary flow path.

Figure 2:
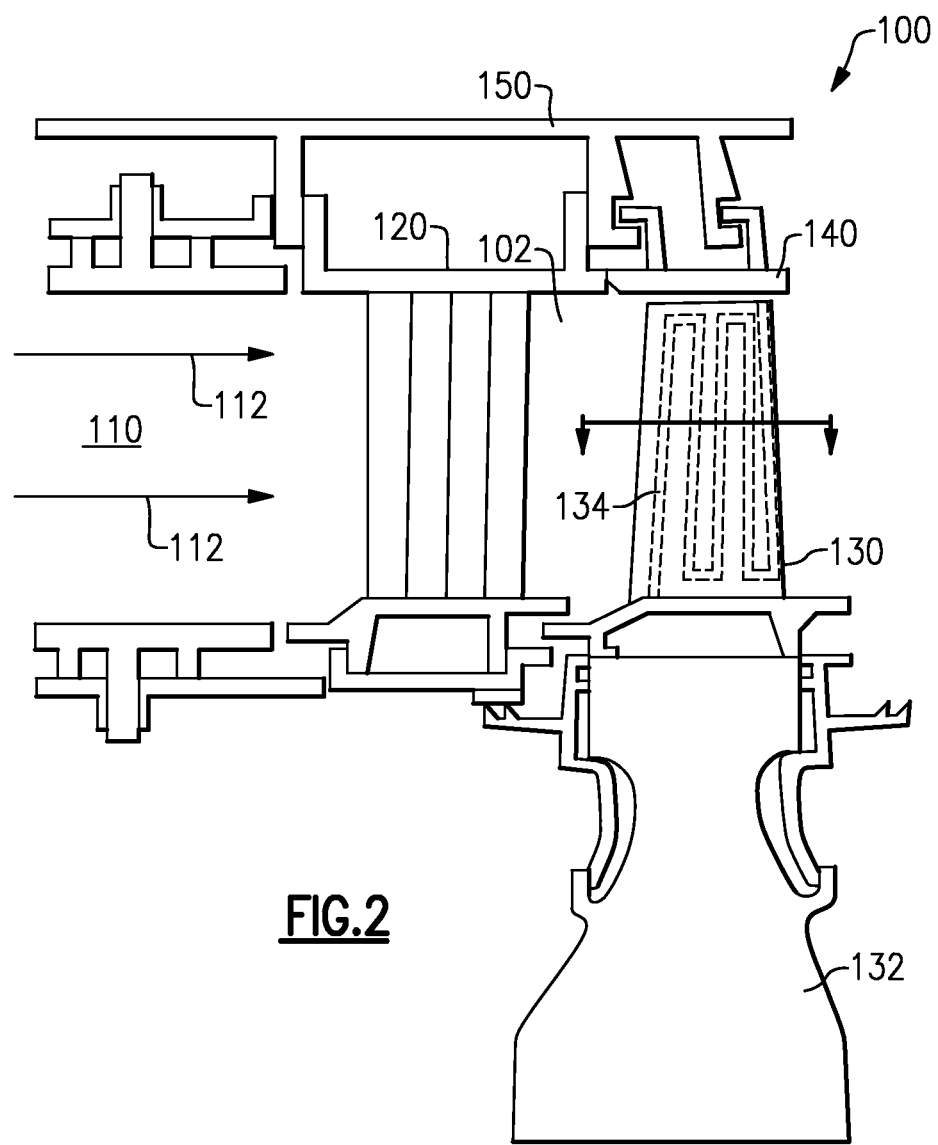
FIG. 2 schematically illustrates an exemplary turbine inlet section of the gas turbine engine of FIG. 1.

With continued reference to FIG. 1, FIG. 2 schematically illustrates a gas turbine engine inlet section 100 immediately aft of a combustor 110. Combustion products 112 are expelled from the combustor 110 along a gas path 102. Disposed within the gas path 102 are a vane 120 and a blade 130. The blade 130 is supported by a disk 132 according to standard turbine blade constructions. Radially outward of the blade 130 is a blade outer air seal 140. Both the blade outer air seal 140 and the vane 120 are supported by an engine case structure 150. In the illustrated example, multiple cooling passages 134 interior to the blade 130 allow a cooling flow to flow through the blade 130. In alternative examples, similar cooling passages can be utilized within the vane 120, or within any gas path element radially spanning, or partially radially spanning the gas path 102.

In yet further examples, internal cooling flow passages can be implemented in any component exposed to the extreme temperatures of the gas path 102, such as the blade outer air seal 140, and is not limited to radially spanning components. While described herein in the context of a turbine inlet, the cross-sectional geometries illustrated and described below are equally applicable in any other section of the gas path and are not limited to turbine inlet components. In some examples, the gas path components are constructed at least partially out of high temperature, brittle, materials, such as ceramic matrix composites and molybdenum.

Figure 3:
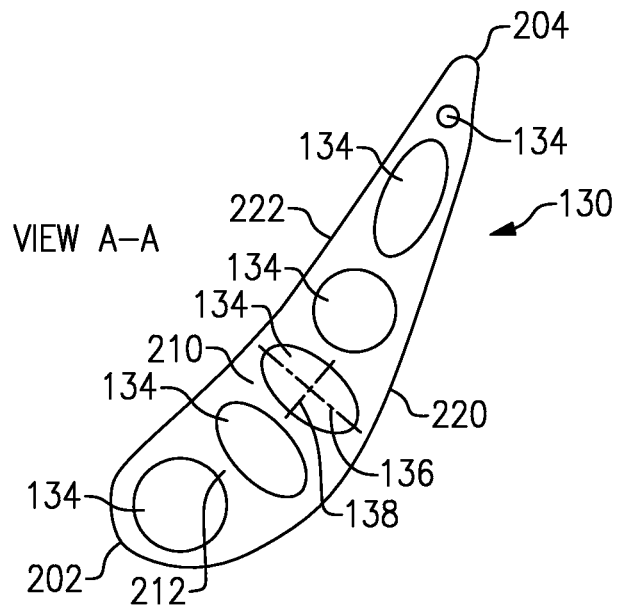
FIG. 3 schematically illustrates a cross sectional view of the blade of FIG. 2 along view lines A-A.

With continued reference to FIG. 2, FIG. 3 illustrates a cross sectional view of the blade 130 of FIG. 2 at view line A-A. The cross section is drawn approximately normal to a radius of the turbine engine 20. The blade 130 has an airfoil shaped cross section including a leading edge 202 and a trailing edge 204. A pressure side 222 and a suction side 220 connect the leading edge 202 to the trailing edge 204. Multiple ribs 210 span from the suction side 220 to the pressure side 222 of the blade 130. Defined between each rib 210 and each adjacent rib 210, as well as between the foremost rib 210 and the leading edge 202 and the aft most rib 210 and the trailing edge 204 are cooling passages 134.

Each of the cooling passages 134 is defined, in part, by a cross section including multiple asymmetrical filleted corners. Each of the filleted corners is an arc of an ellipse. In some examples, the ratio between the axis of the ellipse defining the arc of the filleted corners falls within the range of 1/5 to 5/1. In yet further examples, the ratio falls within the range of 1/3 to 3/1. In the illustrated example of FIG. 3, each of the asymmetrical filleted corners contacts two adjacent asymmetrical filleted corners to form a complete ellipse. In alternative examples, a straight gap can connect each corner to one or more of the adjacent corners.

Figure 4:
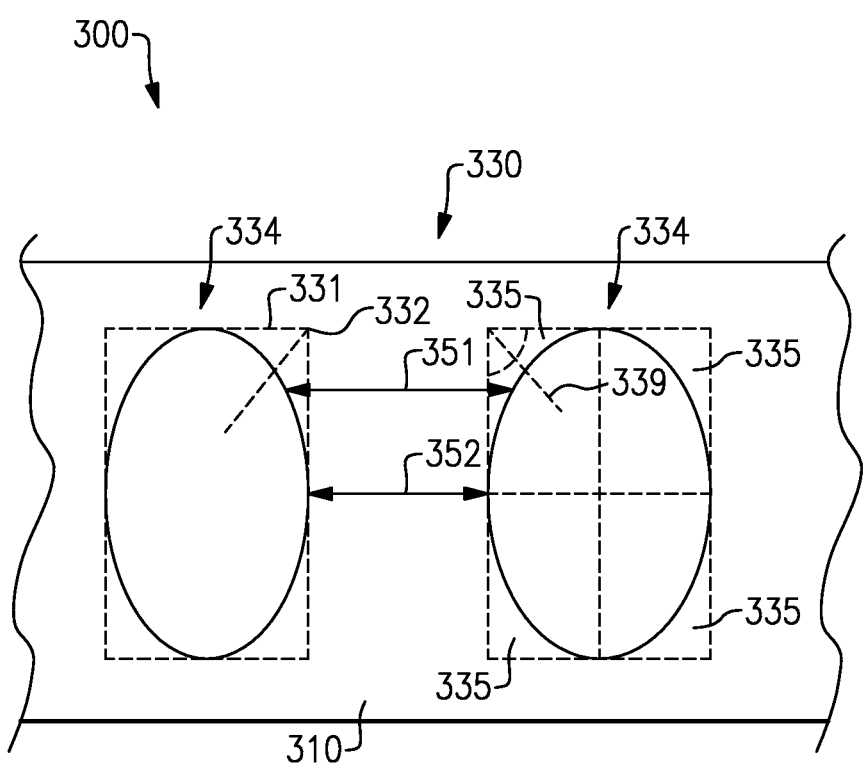
FIG. 4 schematically illustrates a rib portion of an exemplary blade cross section.
Figure 5:
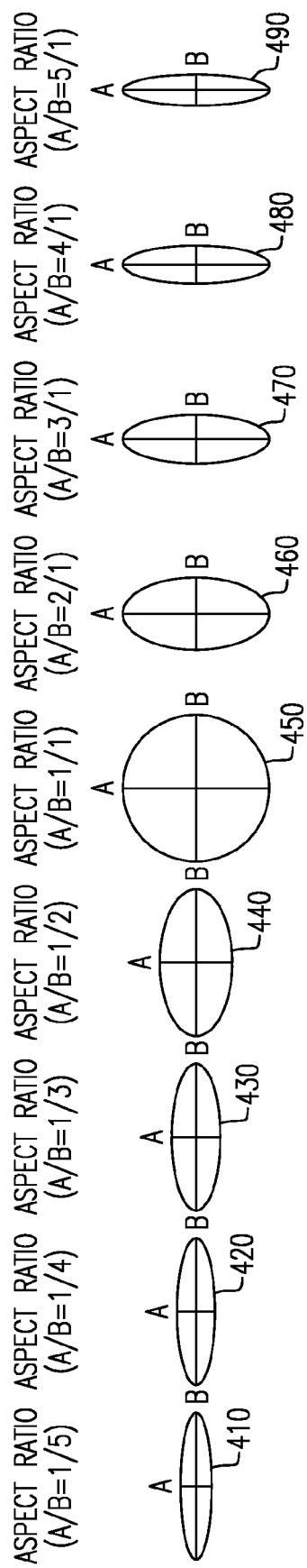
FIG. 5 schematically illustrates a range of elliptical cooling passage aspect ratios.

With continued reference to FIG. 3, and with like numerals indicating like elements, FIG. 4 schematically illustrates a zoomed in partial view 300 of a blade 330, such as could be used for the blade 130 of FIGS. 2 and 3. The zoomed in partial view 300 illustrates a rib 310 and two approximately identical cooling passages 334 adjacent the rib 310.

Existing blade systems typically include rectangular cooling passages 331, illustrated via dashed lines. Each of the rectangular cooling passages 331 would include extended flat sections that restrict heat from penetrating the rib 310 at the corners 332 of the rectangular passage 331. The impedance of the heat flux results in large thermal gradients between the ribs, which are cooler, and the walls of the blade 330, which are hotter. Furthermore, the corners 332 of the cooling passages 334, which can be sharp or contain small symmetrical fillets, result in mechanical stress concentrations. The stress concentrations and the thermal gradients reduce the life-cycle of the blade 330.

The illustrated example blade 330, however, includes cooling passages 334 having an elliptical cross section with the cross section being drawn approximately normal to the expected direction of cooling fluid flow through the cooling passages 334. The elliptical cooling passages 334 include filleted corners 335. The filleted corners 335 are each an individual arc of an ellipse. Each of the filleted corners 335 contacts an adjacent filleted corner 335 to form a semi-ellipse. In the illustrated example of FIG. 4, each semi-ellipse contacts the other semi-ellipse in the cooling passage resulting in a completely elliptical cooling passage 334. In alternative examples, each of the asymmetrical filleted corners 335 can be separated from one or more of the adjacent filleted corners 335 by a straight section.

An axis of symmetry 339 is drawn from the 90 degree corner of a rectangular shape circumscribing the elliptical arc of the asymmetrical filleted corner 335. The axis of symmetry 339 evenly splits the angle of the 90 degree corner. The asymmetrical nature of the filleted corner 335 about the axis of symmetry 339 increases the cross section 351 of the rib 310, relative to the cross section 352 of the rib 310 having rectangular cooling passages. The increased cross section of the rib 310 at the filleted corner 335 allows heat from the gas path to more easily penetrate into the rib 310 from the walls of the blade 330. This, in turn, increases the cooling effect of the cooling passage 334 and reduces the stress concentrations at each of the corners of the cooling passage 334.

With continued reference to FIGS. 2-4, FIG. 5 illustrates a range of elliptical cooling passage cross sections 410-490. Each of the elliptical cooling passage cross sections 410-490 includes a first axis A and a second axis B. The aspect ratio of the elliptical cooling passage cross sections 410-490 is defined as the ratio of the length of the first axis A to the length of the second axis B. In some examples, the asymmetrical filleted corners of extreme aspect ratios, such as 1/5 or 5/1, can result in a cooling passage that is too close in shape to a rectangular passage to allow sufficient heat flux. In such examples, the aspect ratio of first axis A to second Axis B is held within the range of 1/3 to 3/1.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas path component for a gas turbine engine comprising:
an element configured to be exposed to a gas path, the element including a plurality of internal cooling passages, each of said internal cooling passages being separated from at least one adjacent cooling passage in the plurality of cooling passages via a rib, the rib having a smallest cross section normal to an expected flow of coolant through the internal cooling passages at a center point in the cross section normal to the expected flow of coolant; and
at least one of said internal cooling passages includes a cross section having a plurality of asymmetrical filleted corners.

2. The gas path component of claim 1, wherein each of said asymmetrical filleted corners is paired with at least one adjacent asymmetrical filleted corner and each pairing of asymmetrical filleted corners forms a semi-ellipse.

3. The gas path component of claim 2, wherein each of said semi-ellipses is separated from the other semi-ellipse via an extended linear section.

4. The gas path component of claim 2, wherein each semi-ellipsis is paired with an adjacent semi-ellipsis, thereby forming a complete ellipse.

5. The gas path component of claim 1, wherein each of said asymmetrical filleted corners is an elliptical arc.

6. The gas path component of claim 5, wherein the elliptical arc is an arc of an ellipse having a ratio of a first axis to a second axis in the range of 1/5 to 5/1.

7. The gas path component of claim 6, wherein the ratio of the first axis to the second axis is in the range of 1/3 to 3/1.

8. The gas path component of claim 5, wherein the elliptical arc of each of said asymmetrical filleted corners is an arc of a single ellipse.

9. The gas path component of claim 1, wherein said cross section is approximately normal to an expected fluid flow through the cooling passage.

10. The gas path component of claim 1, wherein the element is at least partially constructed of one of molybdenum and a ceramic matrix composite.

11. The gas path component of claim 1, wherein the element is one of a blade, a vane, and a blade outer air seal.

12. The gas path component of claim 1, wherein the element is a radially spanning element configured to at least partially span a gas path of a turbine engine.

13. A method for reducing thermal stress in a gas path component of a gas turbine engine comprising:
disposing at least one cooling passage internal to a gas path component by at least separating two internal cooling passages via a rib, the cooling passage having a cross section normal to an expected flow of coolant through the cooling passage, the cross section including a plurality of asymmetrical filleted corners; and
wherein the rib has a smallest cross section normal to an expected flow of coolant through the internal cooling passages at a center point in the cross section normal to the expected flow of coolant.

14. The method of claim 13, wherein disposing at least one cooling passage internal to the gas path component further includes providing asymmetrical filleted corners for each corner of said at least one passage.

15. The method of claim 14, wherein providing asymmetrical filleted corners for each corner of said at least one passage further comprises providing an ellipse shaped cross section of the cooling passage normal to an expected direction of fluid flow through the cooling passage.

16. A gas turbine engine comprising:
a compressor section;
a combustor section fluidly connected to the compressor section;
a turbine section fluidly connected to the combustor section; and
at least one gas path component including internal cooling passages, each of the internal cooling passages having a cross section approximately normal to an expected direction of fluid flow, the cross section including a plurality of asymmetrical filleted corners, each of said internal cooling passages being separated from at least one adjacent cooling passage in the plurality of cooling passages via a rib, the rib having a smallest cross section normal to an expected flow of coolant through the internal cooling passages at a center point in the cross section normal to the expected flow of coolant.

17. The gas turbine engine of claim 16, wherein at least one of the asymmetrical filleted corners is an elliptical arc of a single ellipse.

18. The gas turbine engine of claim 17, wherein each of the elliptical arcs is directly connected to at least one adjacent elliptical arc, thereby forming a semi-ellipse.

19. The gas turbine engine of claim 18, wherein each of the elliptical arcs is directly connected to two adjacent elliptical arcs, thereby forming a full ellipse.

* * * * *